(12) United States Patent
Agarwal et al.

(10) Patent No.: US 10,380,624 B2
(45) Date of Patent: Aug. 13, 2019

(54) SUBSET MULTI-OBJECTIVE OPTIMIZATION IN A SOCIAL NETWORK

(71) Applicant: Microsoft Technology Licensing, LLC, Redmond, WA (US)

(72) Inventors: Deepak Agarwal, Sunnyvale, CA (US); Shaunak Chatterjee, Sunnyvale, CA (US); Liang Zhang, Fremont, CA (US); Bee-Chung Chen, San Jose, CA (US); Yang Yang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 14/585,863

(22) Filed: Dec. 30, 2014

(65) Prior Publication Data
US 2015/0278962 A1   Oct. 1, 2015

Related U.S. Application Data
(60) Provisional application No. 61/972,662, filed on Mar. 31, 2014.

(51) Int. Cl.
*G06Q 30/00*  (2012.01)
*G06Q 30/02*  (2012.01)
(Continued)

(52) U.S. Cl.
CPC ..... *G06Q 30/0244* (2013.01); *G06F 21/6218* (2013.01); *G06Q 10/06393* (2013.01);
(Continued)

(58) Field of Classification Search
None
See application file for complete search history.

(56) References Cited

U.S. PATENT DOCUMENTS

| | | | | |
|---|---|---|---|---|
| 7,366,759 B2 * | 4/2008 | Trevithick | .............. | H04L 29/06 709/206 |
| 8,447,852 B1 * | 5/2013 | Penumaka | ............. | G06Q 30/02 709/217 |

(Continued)

OTHER PUBLICATIONS

"U.S. Appl. No. 14/634,538, Non Final Office Action dated Feb. 8, 2017", 15 pgs.

(Continued)

*Primary Examiner* — Gurkanwaljit Singh
(74) *Attorney, Agent, or Firm* — Schwegman Lundberg & Woessner, P.A.

(57) ABSTRACT

This disclosure relates to systems and methods that include a member activity database including data indicative of interactions with content items on a social network by a population of users of the social network. A processor is configured to obtain an optimization criterion based on at least two constraints related to a performance of the social network, obtain, for a subset of the population of users, at least some of the data indicative of interactions with content items from the member activity database, determine, based on the at least some of the data as obtained, an operating condition for the social network that is estimated to meet the optimization criterion, and provide, to at least some of the user devices via the network interface, the social network based, at least in part, on the operating condition.

22 Claims, 5 Drawing Sheets

(51) Int. Cl.
  *G06Q 50/00*  (2012.01)
  *H04L 29/08*  (2006.01)
  *G06F 21/62*  (2013.01)
  *G06Q 10/06*  (2012.01)
(52) U.S. Cl.
  CPC ............ *G06Q 50/01* (2013.01); *H04L 67/22* (2013.01); *H04L 67/306* (2013.01)

(56) References Cited

U.S. PATENT DOCUMENTS

| | | | |
|---|---|---|---|
| 9,117,227 B1 | 8/2015 | Agrawal et al. | |
| 9,363,223 B2* | 6/2016 | Arquette | H04L 51/32 |
| 2002/0116466 A1* | 8/2002 | Trevithick | H04L 29/06 |
| | | | 709/206 |
| 2007/0266097 A1* | 11/2007 | Harik | G06Q 30/02 |
| | | | 709/204 |
| 2010/0306249 A1* | 12/2010 | Hill | G06F 17/30867 |
| | | | 707/769 |
| 2011/0258064 A1* | 10/2011 | Agarwal | G06Q 30/02 |
| | | | 705/26.1 |
| 2013/0138708 A1 | 5/2013 | Hamada et al. | |
| 2013/0297781 A1* | 11/2013 | Altshuler | H04L 41/12 |
| | | | 709/224 |
| 2014/0019261 A1 | 1/2014 | Hegeman et al. | |
| 2014/0365349 A1* | 12/2014 | Kennon | G06Q 50/01 |
| | | | 705/34 |
| 2014/0365572 A1* | 12/2014 | Kennon | G06Q 50/01 |
| | | | 709/204 |
| 2015/0100415 A1 | 4/2015 | Yu et al. | |
| 2015/0278850 A1 | 10/2015 | Chatterjee et al. | |

OTHER PUBLICATIONS

"U.S. Appl. No. 14/634,538, Examiner Interview dated Aug. 8, 2017", 3 pgs.
"U.S. Appl. No. 14/634,538, Final Office Action dated Jul. 13, 2017", 26 pgs.
"U.S. Appl. No. 14/634,538, Response filed Jun. 8, 2017 to Non Final Office Action dated Feb. 8, 2017", 16 pgs.
"Non Final Office Action issued in U.S. Appl. No. 14/634,538", dated May 21, 2018, 22 Pages.
"Response to Non Final Office Action filed in U.S. Appl. No. 14/634,538", filed Jan. 16, 2018, 17 Pages.

* cited by examiner

SUBSET MULTI-OBJECTIVE OPTIMIZATION IN A SOCIAL NETWORK

PRIORITY

This application claims the benefit of priority to U.S. Provisional Patent Application No. 61/972,662, "SYSTEM AND METHOD FOR SUBSET MULTI-OBJECTIVE OPTIMIZATION IN A SOCIAL NETWORK", which is incorporated herein by reference in its entirety.

TECHNICAL FIELD

The subject matter disclosed herein generally relates to utilizing a subset for general multi-objective optimization in a social network.

BACKGROUND

Providers and administrators of social networks may have various metrics and objectives by which the success of the social network is judged. User engagement with the social network may be determined based on activities by the users within the social network, such as by clicking links, commenting on posts to the social network, and posting new content to the social network, among many potential activities in the social network. Revenue may also be a factor by which success is judged, as the providers of social networks may have expenses that may need to be met as well as a profit motive. In various circumstances, the steps that a social network provider may take to increase revenue, such as by displaying advertisements or sponsored content, may tend to reduce user engagement with the social network.

BRIEF DESCRIPTION OF THE DRAWINGS

Some embodiments are illustrated by way of example and not limitation in the figures of the accompanying drawings.

DETAILED DESCRIPTION

Example methods and systems are directed to subset multi-objective optimization. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Multi-objective optimization techniques have been developed that may provide for generating an operating condition for a social network to optimize the various constraints in the social network. Thus, in the above example, an optimization criterion may be to maximize revenue while maintaining user engagement of at least ninety-five (95) percent of a baseline. Such optimization techniques may, for instance, display various amounts of revenue-generating content to users until a maximum revenue-generating content amount is determined that still produces user engagement of at least ninety-five (95) percent of the baseline.

However, various social networks have users and membership that is measured in the tens or hundreds of millions of unique users. Consequently, simply modeling or directly implementing a multi-objective optimization process on the social network as a whole may be computationally inefficient and/or may expose large numbers of users to a process that may have deleterious effects on their user experience until a preferred operating condition for the social network is determined that meets the objectives. As a result, the multi-objective optimization techniques include provisions to predetermine a subset of users of the social network that may provide statistically relevant data for what configuration may produce the desired objectives when implemented by a larger portion of the social network as a whole. The statistical significance of the size of the subset may relate to the number of objectives that are sought. Thus, the size of the predetermined subset may thus be chosen depending on the number of constraints in the optimization, with the size of the subset increasing based on the number of constraints.

Figure 1:
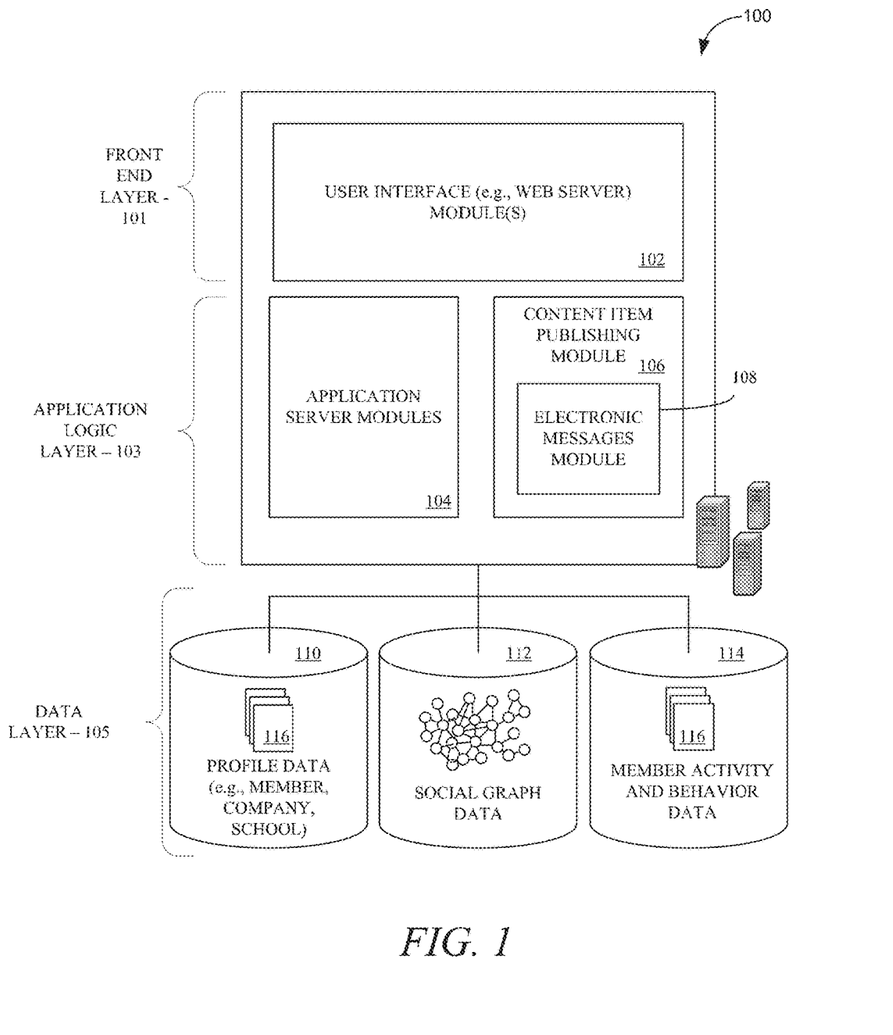
FIG. 1 is a block diagram illustrating various components or functional modules of a social network, in an example embodiment.

FIG. 1 is a block diagram illustrating various components or functional modules of a social network 100, consistent with some examples. The social network 100 may be utilized to provide treaded electronic messages within the user interface of the social network 100. While the threading of electronic messages are described with particular respect to the social network 100, it is to be recognized and understood that the principles described with respect to threaded electronic messages may be applied to any of a variety of platforms and electronic messages beyond those directly applicable to a social network generally.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a content item publishing module 106, such as may be utilized to receive content, such as electronic messages, posts, links, images, videos, and the like, and publish the content to the social network. The one or more of the content item publishing module 106, the application server modules 104, or the social network 100 generally may include a multi-objective optimization module 108. As will be disclosed in detail herein, the multi-objective optimization module 108 may manage electronic messages and organize and display such electronic messages according to objectives determined by the administrators of the social network.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, information concerning content items interacted with, such as by viewing, playing, and the like, etc.) may be monitored and information concerning the interaction may be stored, for example, as indicated in FIG. 1 by the database 114. Thus, previous interactions with a content item by various users of the social network 100 may be stored and utilized in determining, among other factors, how various types of content items, such as organic content items and sponsored content items, result in differences in engagement levels with the content items by users of the social network 100.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
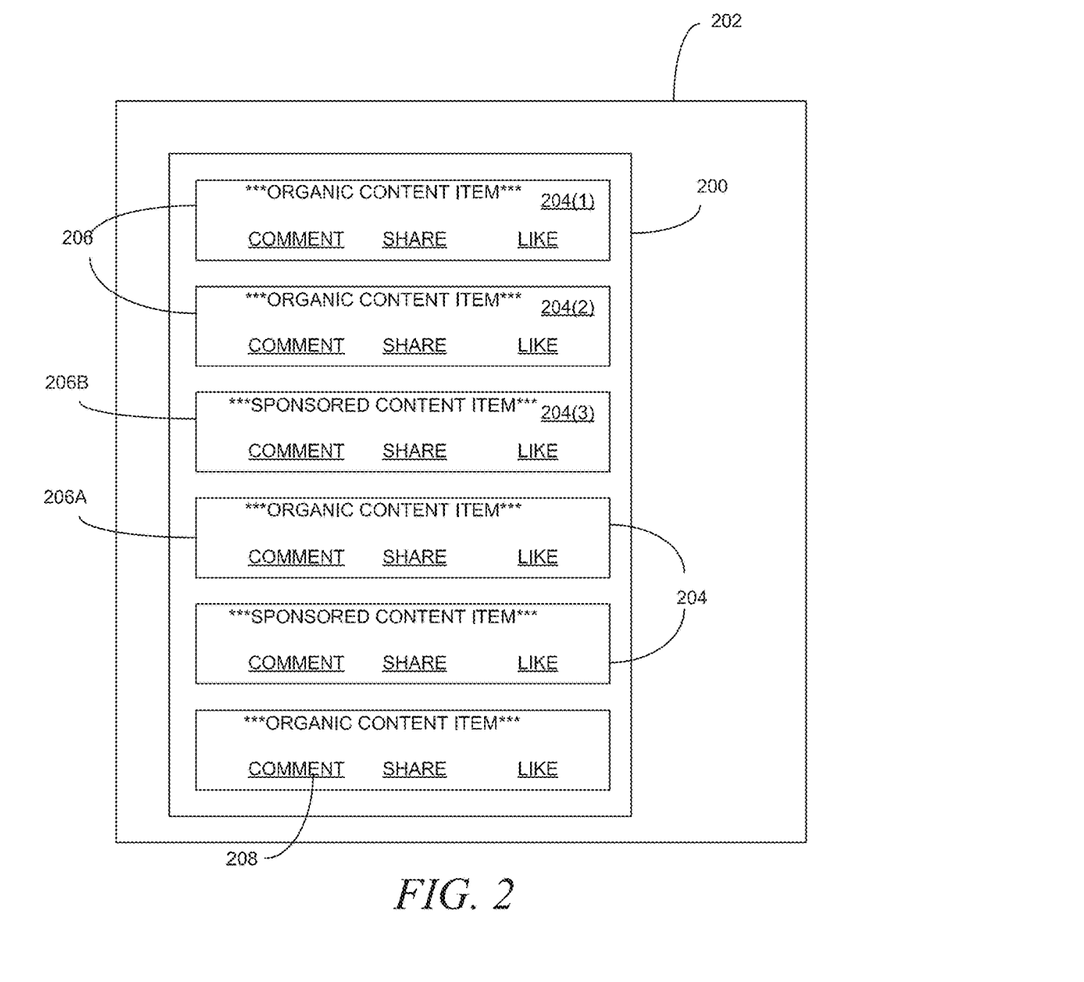
FIG. 2 is an abstract depiction of a newsfeed as displayed on a user interface and as generated by a user interface module in an example embodiment.

FIG. 2 is an abstract depiction of a newsfeed 200 as displayed on a user interface 202 and as generated by the user interface module 102, in an example embodiment. The newsfeed 200 includes multiple positions 204 in which individual content items 206 are displayed. While the positions 204 are illustrated as a top-down list, it is to be understood that the positions 204 may be any of a variety of ordered or orderable positions 204, such as tiles or a ribbon bar. The content items 206 are variously organic content items 206A generated based on content provided to the social network by users of the social network and sponsored content items 206B generated based on a fee paid to the administrators of the social network to have the sponsored content items 206B displayed on the newsfeed 200.

Various content items 206 include links or selectable menu items 208 with which a user viewing the newsfeed 200 may interact with content items 206. Selecting a link 208 may cause a related article to be displayed on the user interface 202, may allow the user to comment on, share, "like," or otherwise interact with the content item 206. Interaction with a link 208 by a user may be registered in the member activity and behavior database 114 as an engagement with the associated content item 206.

The positions 204 may be ranked according to their relative order in the newsfeed 200 and/or corresponding to their relative visibility to or likelihood of being interacted with by a user on the newsfeed 200. For instance, a first position 204(1) may be the most likely position to be interacted with by a user followed in sequence by a second position 204(2), a third position 204(3), and so forth. Each position 204 may be assigned a relative value indicative of the relative visibility of or likelihood of interaction with a corresponding content item 206. Thus, in an abstract example, the first position 204(1) may be assigned a value of "10", the second position 204(2) may be assigned a value of "7", the third position 204(3) may be assigned a value of "5", and so forth.

Figure 3:
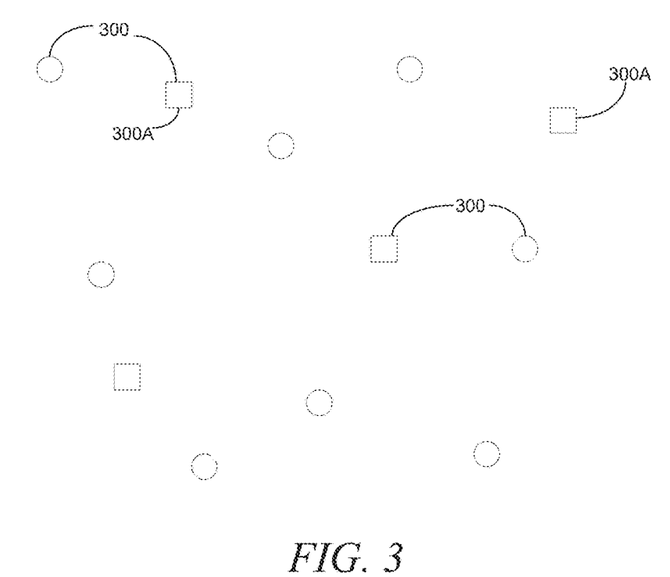
FIG. 3 is an abstract depiction of the information in the social graph database, in an example embodiment.

FIG. 3 is an abstract depiction of the information in the social graph database 112, in an example embodiment. Individual users 300 may access a newsfeed 200 on user devices 202, such as by logging in to the individual user's 300 account on the social network 100. The users 300 depicted represent variously all of the users of the social network 100 or a portion of the users of the social network 100 to which the multi-objective optimization techniques described herein may be applied.

The multi-objective optimization module 108 may select a subset of users 300A (denoted by squares in FIG. 3) of the total population of the users 300 (denoted by both circles and squares in FIG. 3) on which to perform multi-objective analysis. The users 300A in the subset may be randomly selected from the total population of users 300 or may be selected based in part on profile data 116 of the users 300. In an example, the users 300A of the subset may be selected so that profile data 116 of the users 300A of the subset broadly matches the profile data of the total population of users 300, i.e., so that the subset meets some standard of being representative of the whole population. Such a standard may include or otherwise produce a distribution of the profiles of the users 300A of the subset that is the same or substantially similar to that of the total population of users 300.

In various examples, a size of the subset of users 300A may be selected by the multi-objective optimization module 108 based on a number of objectives or constraints for which performance is being optimized and a size of the total population of users 300. Further, a proportionate size of the subset of users 300A to the total population of users 300 may increase as the total population of users 300 decreases. For instance, in an illustrative example, with two (2) objectives or constraints and a total population of users 300 of three hundred million (300,000,000), the multi-objective optimization module 108 may select approximately two thousand (2,000) users 300A to be part of the subset. With three (3) objectives or constraints the multi-objective optimization module 108 may select approximately three thousand (3,000) users 300A to be part of the subset, and so forth. With a total population of users 300 of one hundred and fifty million (150,000,000), the multi-objective optimization module 108 may select approximately one thousand four hundred (1,400) users 300A for the subset to optimize for two (2) objectives or constraints or approximately two thousand one hundred (2,100) users 300A for the subset to optimize for three (3) objectives or constraints.

The multi-objective optimization module 108 may further adjust the size of the subset of users 300A based on a desired statistical confidence in the ultimately-determined optimized configuration, as disclosed herein. For instance, in an illustrative example, if the above subset sizes produce a statistical likelihood that the optimization, when applied to the total population, will be accurate to plus-or-minus two (2) percent ninety-five (95) percent of the time, then increasing the subset size may produce better accuracy more reliably while decreasing the subset size may produce worse accuracy less reliably. However, increasing the subset size may increase a need for computational resources and time to determine the optimization while decreasing the subset size may lessen the need for computational resources and time.

In various examples, the multi-objective optimization module 108 may perform modeling based on the subset of users 300A of the effect of changing various constraints. As will be disclosed herein, additionally or alternatively the subset of users 300A may be utilized to test the constraints as optimized either concurrent with applying the constraints as optimized to the total population of users 300 or before applying the constraints as optimized to the total population of users 300. Such a test of the constraints as optimized may be utilized to update assumptions or the optimization techniques and/or, in the case of testing the constraints as optimized prior to applying the constraints to the total population of users 300, prevent constraints that do not produce the desired result from being applied to the total population of users 300. It is noted that while the test is described as applying to the same subset of users 300A as was used to model the constraints in the first instance, the subset of users on which the constraints as optimized may be applied may be different from the subset of users 300A to which the model was applied. Thus, the constraints as optimized may be determined based on a first subset of users 300A while the constraints as optimized may be tested on a second subset of users 300 that include some, all, or none of the first subset of users 300A.

As disclosed herein, the constraints may be: total engagement by users 300 with content items 206; and revenue. As noted, engagement may be determined based on a user interaction with a content item 206, with total engagement being determined based on a total number of interactions. In various illustrative examples, each interaction counts toward engagement the same as each other interaction; thus, a single user 300 reading a posted article, commenting on the article, and "liking" the article may produce three (3) equal engagement counts. Alternatively, a given user 300 may only receive one (1) engagement count regardless of the number of times the user 300 interacts with a single content item 206; thus, the above example would produce only one (1) engagement count. Further alternatively or additionally, certain interactions may be considered to create relatively more engagement than others; thus, reading the article may produce one (1) engagement count, commenting on the article may produce 1.5 engagement counts, and "liking" the article may produce 0.5 engagement counts.

Relative engagement levels for the various positions 204 may be determined based on relative differences in engagement counts for the positions 204. Thus, the first position 204(1) may have an engagement level of 1.0 while the second position 204(2), which may generate only eighty (80) percent of the engagement counts as the first position 204(1), may have an engagement level of 0.8. The value of positions 204 may be determined, at least in part, based on an the engagement level or an average number of engagement counts that content items 206 in the given position 204 tend to generate. Thus, the first position 204(1) may be considered the first position 204(1) because content items 206 placed in the first position 204(1) tend to generate the most engagement counts of all of the positions 204, the second position 204(2) may be considered the second position 204(2) because content items 206 placed in the second position 204(2) tend to generate the second most engagement counts, and so forth. Thus, the value of positions 204 may be determined without respect to a relative physical position of the positions 204. The individual values of the individual positions 204 may be determined based on an aggregate of the content items 206 placed in the positions or may be separately determined based on As the users 300 of the social network 100 utilize the social network 100 over time and their interactions with content items 206 is recorded in the member activity and behavior database 114, an impact on engagement of placing sponsored content items 206B in various position 204 instead of organic content items 206A may be determined. For instance, over time both organic content items 206A and sponsored content items 206B may be presented to users 300 in the first position 204(1). In an illustrative example, the multi-objective optimization module 108 may determine, based on user 300 interaction with the various content items 206 placed in the first position 204(1), that the first position 204(1) has a normalized engagement level of 1.0 when populated by organic content items 206A and an engagement level of 0.6 when populated by sponsored content items 206B, i.e., that the average user is forty (40) percent less likely to engage with a sponsored content item 206B in the first position 204(1) than an organic content item 206A.

Within each position 204, the ratio of organic content 206A to sponsored content 206B may be based on the position across the newsfeeds 200 as displayed to each of the users 300 individually, either of the total population following the multi-objective optimization or the subset while the multi-objective optimization module 108 is determining a potential optimal configuration. However, in various examples utilized herein, only one content item 206 may be in a given position 204 at a time. As such, the ratio applies to unique presentations of the newsfeed 200 to multiple users 300 over time. Thus, if a particular position 204 has a ratio of four (4) organic content items 206A in a given position for every one (1) sponsored content item 206B, that would imply that, as the newsfeed 200 is presented to multiple users 300 over time, organic content items 206A would tend to be placed in the position 204 four (4) times for every one (1) time a sponsored content item 206B is placed in the position 204.

Thus, considering the first position 204(1) in isolation for the purposes of this example, the multi-objective optimization module 108 may determine that if sponsored content items 206B were placed in the first position 204(1) all the time that engagement with content items 206 in the first position 204(1) would be expected to drop forty (40) percent compared with placing only organic content items 206B in the first position 204(1). Relatedly, if sponsored content items 206B were placed in the first position 204(1) half the time and organic content items 206A were placed in the first position 204(1) the other half then engagement with content items 206 in the first position 204(1) would be expected to be twenty (20) percent less than if only organic content items 206A were placed in the first position 204(1).

Moreover, the multi-objective optimization module may consider changes to engagement with content items 206 in a position 204 relative to a baseline rather than relative to only using organic content items 206A. Thus, for instance, a baseline mix of organic content items 206A and sponsored content items 206B may be normalized to an engagement value of 1.0 and changes to the ratio of organic content items 206A and sponsored content items 206B displayed in the position 204 may increase or decrease the engagement value relative to the 1.0 baseline. Increasing the ratio of organic content items 206A to sponsored content items 206B may tend to increase engagement while decreasing the ratio may end to decrease engagement.

In various examples, the principles described with respect to one position 204 may be applied to each of the positions 204 individually and a profile of the newsfeed 200 as a whole developed. Thus, the organic content item 206A to sponsored content item 206B ratio may be adjusted for each position 204 individually to arrive at a particular engagement level for the social network 100 as a whole. Alternatively, the principles described with respect to one position 204 may be applied to the newsfeed 200 as a whole without respect to individual positions 204. Thus, positions 204 may be ignored and the overall ratio of organic content items 206A and sponsored content items 206B may be considered for the newsfeed 200 as a whole. Such an approach may be computationally relatively simple but may be relatively less accurate than considering positions 204 individually.

As disclosed herein, the multi-objective optimization module 108 may also factor in revenue as a constraint. Revenue may be generated based on sponsored content items 206B and may be based on the simple presentation of sponsored content items 206B on the newsfeed 200 ("impressions") and/or based on user 300 engagement with the sponsored content item 206B, such as according to the mechanisms disclosed herein (reading, commenting, liking; generally the "click-through rate"). The providers of sponsored content items 206B may associate a bid or a fee with the sponsored content item 206B that may be paid to the social network 100 provider upon the sponsored content item 206B being displayed in a newsfeed 200 or upon a user 300 engaging with the sponsored content item 206B, as appropriate. The bid or fee may be specific to a particular position 204 in which the sponsored content item 206B is displayed and may be higher or lower depending on the visibility of the position 204 and the likelihood of user 300 engagement with sponsored content items 206B in various positions.

Revenue from the placement of a sponsored content item 206B may thus be known prior to placement of the sponsored content item 206B in the newsfeed 200 if the revenue is based on impressions. Additionally or alternatively, revenue may be estimated prior to placement of the sponsored content item 206B in the newsfeed 200 based on the bid associated with the sponsored content item 206B multiplied by the click-through rate for the position 204 in which the sponsored content item 206B is to be placed. Thus, the first position 204(1) may be associated with higher revenue or higher expected revenue than the second position 204(2), which may be associated with higher revenue or expected revenue than the third position 204(3), and so forth.

Figure 4:
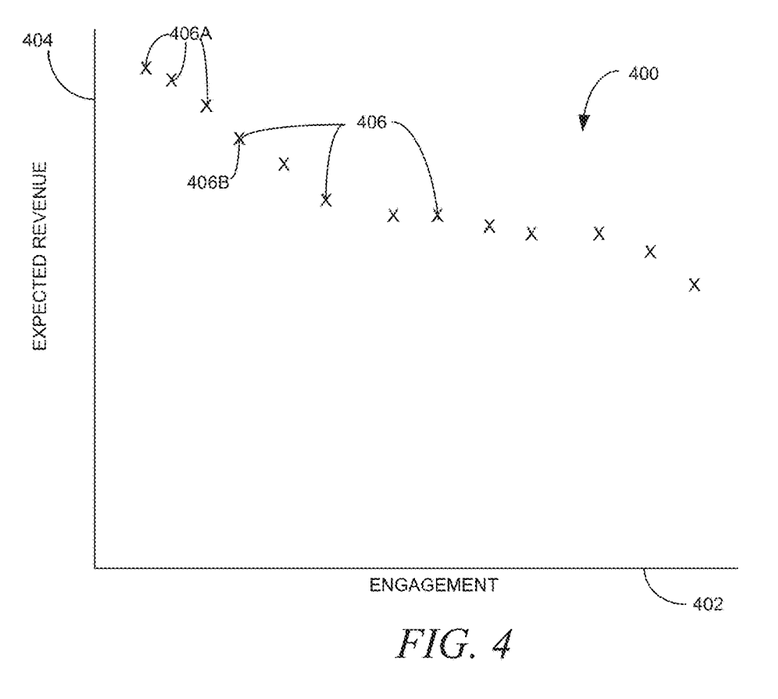
FIG. 4 illustrates a Pareto curve that may be generated by a multi-objective optimization module, in an example embodiment.

FIG. 4 illustrates a Pareto curve 400 that may be generated by the multi-objective optimization module 108, in an example embodiment. The multi-objective optimization module 108 may analyze each position 204 on the impact to engagement and revenue to various ratios of organic sponsored content items 206A and sponsored content items 206B. The multi-objective optimization module 108 may thus, for a number of positions X, perform $2^X$ computations to create a Pareto curve with engagement 402 on one axis and expected revenue 404 on the orthogonal axis. Given the potentially large number of computations then, utilizing a statistically significant subset of users 300A may provide significant computational savings over utilizing the total population of users 300. The Pareto curve 400 is a mechanism for visualizing the resultant data points 406 and it is to be understood that the multi-objective optimization module 108 may generate the data points 406 without necessary creating the curve 400 itself.

As noted here, the data for engagement with content items 206 in different positions 204 and, by extension, estimated revenue may be based on data stored in the member activity and behavior database 114 for the subset of users 300A. Thus, the Pareto curve 400 may, in various examples, be generated without having to collect new data. The multi-objective optimization module 108 may utilize member activity and behavior data stretching back a predetermined period of time or may utilize a fixed amount of the most recent member activity and behavior data across the subset of users 300A.

Each data point 406 represents a mix of organic and sponsored content items 206A, B within various positions 204. Alternatively, each data point 406 may represent the mix of organic and sponsored content items 206A, B throughout the newsfeed 200 without respect to positions 204. Each data point 406 thus anticipates revenue based on a given mix of content items 206 and, if implemented with respect to the social network, provides an operating condition for the mix of content items that is estimated to produce a certain amount of revenue.

As disclosed herein, the multi-objective optimization module 108 may include a particular optimization criterion that may be applied to select a particular data point to be implemented with the total population of users 300. For instance, as described above, the optimization criterion may be to maximize revenue while maintaining at least ninety-five (95) percent total engagement relative to a baseline. (This example is presented herein for consistency of illustration; it is to be emphasized that any suitable constraints may be utilized and any suitable criterion or criteria within those constraints may be utilized.) In the illustrated curve 400, then, while some data points 406A may have relatively high expected revenue they also would be expected to reduce total engagement by more than five (5) percent. As a result, the data point 406B that has the highest revenue and a total engagement of ninety-five (95) percent or better may be selected by the multi-objective optimization module 108 and the mix of organic and sponsored content items 206A, B applied as an operating condition to the total population of users 300.

The content item 206 mix specified by the data point 406B may be subjected to a preliminary or trial run, such as with the subset of users 300A or with a second subset of users 300 that include some, all, or none of the first subset of users 300A. Alternatively, the preliminary run may be with the total population 300. Based on the actual results of the preliminary run the multi-objective optimization module 108 may make adjustments to the mechanisms described herein to account for deviations from the expected result. For instance, if total engagement decreases by more than five (5) percent then the proportion of sponsored content items 206B displayed on the newsfeed may be reduced. Adjustments based on actual performance may be incorporated on an ad hoc basis for the current data point 406B. Alternatively, such adjustments may be maintained as permanent or semi-permanent adjustment factors to provide adjustments to future optimizations. Such adjustment factors may be aggregated over time and eventually discarded as they become out of date or are replaced by more recent adjustments.

The term "optimized" and related words should not be taken as meaning strictly optimized or maximized for the purposes of this disclosure. Thus, the optimization techniques do not necessarily require finding an absolutely optimal or maximized operating condition for the social network 100. Moreover, a maximally optimized operating condition that is determined may not necessarily be utilized and a less than maximally optimized operating condition may be selected instead, such as if, in the above example, a relatively small decrease in revenue may produce a relatively large increase in user engagement. The multi-objective optimization module 108 may be configured with logic that would allow for, for instance, selecting a revenue total that is 0.2 percent less than the maximum value for a two (2) percent relative increase in engagement.

Flowchart

Figure 5:
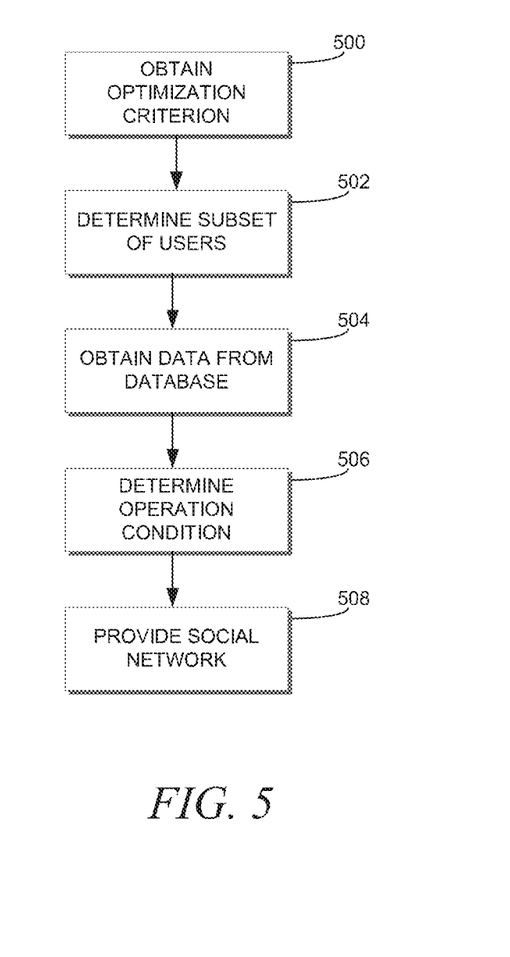
FIG. 5 is a flowchart for subset multi-objective optimization in a social network, in an example embodiment.

FIG. 5 is a flowchart for subset multi-objective optimization in a social network, in an example embodiment. The flowchart may be performed with any of a variety of devices and systems disclosed herein, as well as with any suitable system known in the art.

At operation 500, an optimization criterion is obtained with a processor based on at least two constraints related to a performance of the social network. In an example, one of the at least two constraints is user engagement with the social network. In an example, another one of the at least two constraints is revenue generated by the social network. In an example, the optimization criterion is configured to provide for a maximized revenue while maintaining user engagement within a percentage of a baseline.

At operation 502, a subset of users is determined by the processor based, at least in part, on a similarity between profile information in a profile database of the users of the subset and profile information in the profile database of the population of users.

At operation 504, at least some of the data indicative of interactions with content items from the member activity database is obtained from a member activity database, with the processor, for the subset of a population of users of a social network and having data indicative of previous interactions with content items of the social network by the population of users.

At operation 506, an operating condition for the social network that is estimated to meet the optimization criterion is determined with the processor based on the at least some of the data as obtained.

At operation 508, the social network is provided via a network interface, with the processor, to at least some of the user devices via the network interface, based, at least in part, on the operating condition. In an example, the social network is provided by causing the content items to be displayed on the user devices, and wherein user engagement is based, at least in part, on interaction by users with the content items. In an example, the interaction with the content items includes at least one of accessing a link included in the content item, commenting on the content item, sharing the content item, and providing an indication of approval of the content item.

In an example, the content items include organic content items provided to the social network by the users of the social network and sponsored content items provided to the social network by sponsors of the content items, and wherein the operating condition is based, at least in part, on a percentage mix of organic content items and sponsored content items. In an example, providing the social network is by arranging the content items within positions in a newsfeed. In an example, the content items include organic content items provided to the social network by the users of the social network and sponsored content items provided to the social network by sponsors of the content items, and wherein the operating condition is based, at least in part, on a separate percentage mix of organic content items and sponsored content items within individual positions. In an example, providing the social network is based, at least in part, on the operating condition to all of the users of the social network.

System

Figure 6:
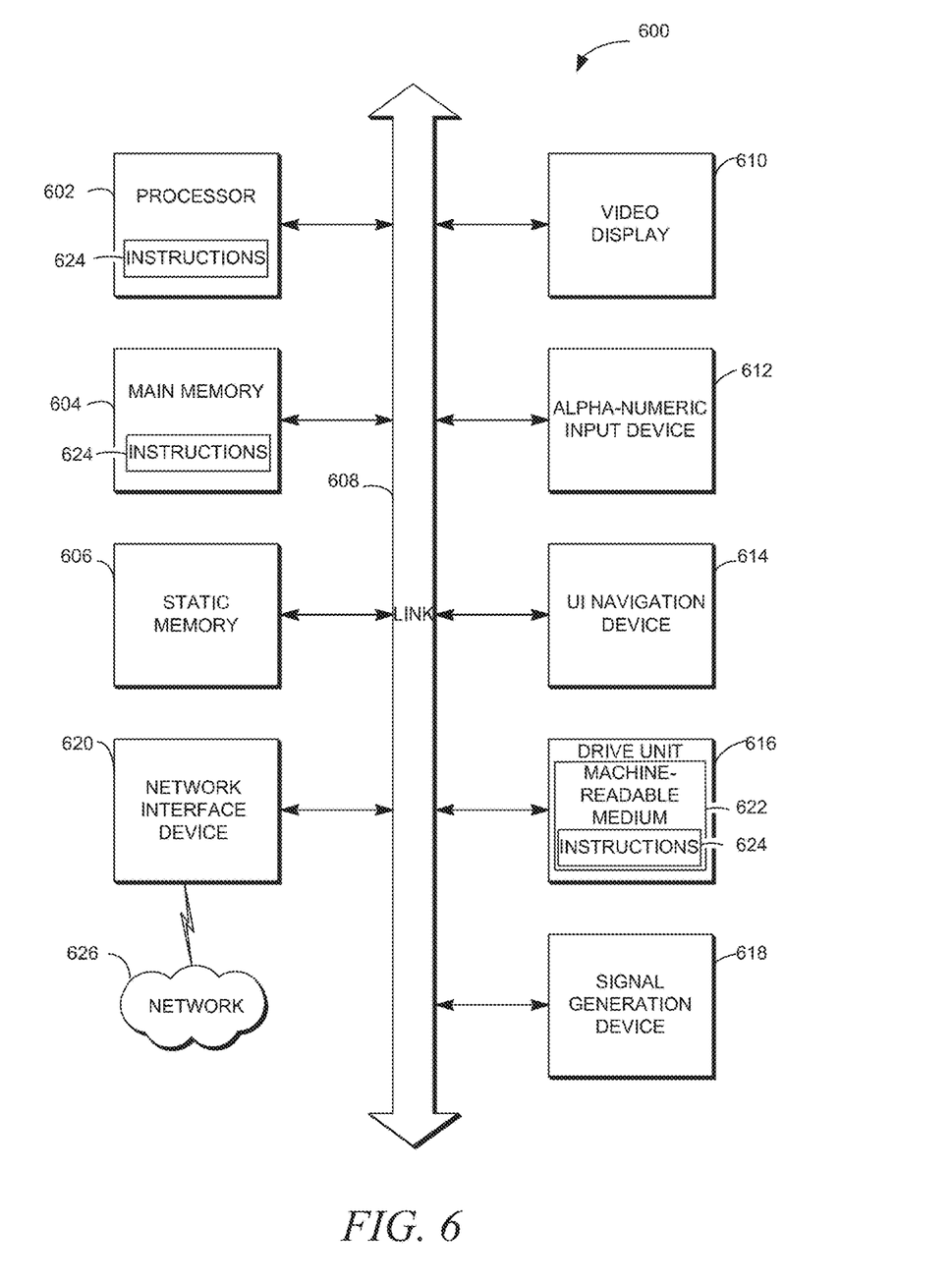
FIG. 6 is a block diagram illustrating components of a machine able to read instructions from a machine-readable medium.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:

obtaining, with a processor, an optimization criterion based on at least two constraints related to a performance of an online social networking system;

obtaining, with the processor, from a member activity database, data indicative of interactions with content items by a first subset of a population of users of the online social networking system, the content items having been displayed in individual ones of a plurality of sequentially-ordered positions of a content item feed;

providing via a network interface, with the processor, to user devices of a second subset of the population of users different than the first subset, a mix of content items selected to meet the optimization criterion based on the data indicative of interactions by the first subset as obtained, the mix of content items provided in the plurality of positions of the content item feed;

storing, in the member activity database, data indicative of interactions by users of the second subset with the mix of content items;

determining, with a processor, for a position of the plurality of positions, a ratio of a first type of the plurality of content items of the mix to a second type of the plurality of content items of the mix to meet the optimization criterion; and based on the optimization criterion being met the data indicative of interactions by users of the second subset, providing, via the network interface, with the processor, to user devices of the population of users, the mix of content items, wherein content items of the first and second types are displayed in the position according to the ratio for the population of users as a whole.

2. The method of claim 1, wherein one of the at least two constraints is user engagement with the online social networking system.

3. The method of claim 2, wherein another one of the at least two constraints is revenue generated by the online social networking system.

4. The method of claim 3, wherein the optimization criterion is configured to provide for a maximized revenue while maintaining user engagement within a percentage of a baseline.

5. The method of claim 2, wherein providing the online social networking system is by causing the content items to be displayed on the user devices, and wherein user engagement is based, at least in part, on interaction by users with the content items.

6. The method of claim 5, wherein the interaction with the content items includes at least one of accessing a link included in the content item, commenting on the content item, sharing the content item, and providing an indication of approval of the content item.

7. The method of claim 5, wherein the first type is organic content items provided to the online social networking system by the users of the online social networking system and the second type is sponsored content items provided to the online social networking system by sponsors of the content items.

8. The method of claim 5, wherein providing the online social networking system is further according to a ratio of the first type to the second type across all of the positions of the content item feed.

9. A computer readable medium comprising instructions that, when executed on a processor, cause the processor to implement operations comprising:
obtain an optimization criterion based on at least two constraints related to a performance of the social network;
obtain, from a member activity database, data indicative of interactions with content items by a first subset of a population of users of the online social networking system, the content items having been displayed in individual ones of a plurality of sequentially-ordered positions of a content item feed;
provide, via a network interface, to user devices of a second subset of the population of users different than the first subset, a mix of content items selected to meet the optimization criterion based on the data indicative of interactions by the first subset as obtained, the mix of content items provided in the plurality of positions of the content item feed;
store, in the member activity database, data indicative of interactions by users of the second subset with the mix of content items;
determine, for a position of the plurality of positions, a ratio of a first type of the plurality of content items of the mix to a second type of the plurality of content items of the mix to meet the optimization criterion; and
based on the optimization criterion being met the data indicative of interactions by users of the second subset, provide, via the network interface, with the processor, to user devices of the population of users, the mix of content items, wherein that content items of the first and second types are displayed in the position according to the ratio for the population of users as a whole.

10. The computer readable medium of claim 9, wherein one of the at least two constraints is user engagement with the online social networking system.

11. The computer readable medium of claim 10, wherein one of the at least two constraints is user engagement with the online social networking system.

12. The computer readable medium of claim 11, wherein the optimization criterion is configured to provide for a maximized revenue while maintaining user engagement within a percentage of a baseline.

13. The computer readable medium of claim 10, providing the online social networking system is by causing the content items to be displayed on the user devices, and wherein user engagement is based, at least in part, on interaction by users with the content items.

14. The computer readable medium of claim 13, wherein the interaction with the content items includes at least one of accessing a link included in the content item, commenting on the content item, sharing the content item, and providing an indication of approval of the content item.

15. The computer readable medium of claim 13, wherein the first type is organic content items provided to the online social networking system by the users of the online social networking system and the second type is sponsored content items provided to the online social networking system by sponsors of the content items.

16. A system, comprising:
a processor; and
a computer readable medium, operatively coupled to the processor, comprising instructions that, when executed on the processor, cause the processor to implement operations comprising:
obtain an optimization criterion based on at least two constraints related to a performance of the social network;
obtain, from a member activity database, data indicative of interactions with content items by a first subset of a population of users of the online social networking system, the content items having been displayed in individual ones of a plurality of sequentially-ordered positions of a content item feed;
provide, via a network interface, to user devices of a second subset of the population of users different than the first subset, a mix of content items selected to meet the optimization criterion based on the data indicative of interactions by the first subset as obtained, the mix of content items provided in the plurality of positions of the content item feed;
store, in the member activity database, data indicative of interactions by users of the second subset with the mix of content items;
determine, for a position of the plurality of positions a ratio of a first type of the plurality of content items of the mix to a second type of the plurality of content items of the mix to meet the optimization criterion; and
based on the optimization criterion being met the data indicative of interactions by users of the second subset, provide, via the network interface, with the processor, to user devices of the population of users, the mix of content items, wherein that content items of the first and second types are displayed in the position according to the ratio for the population of users as a whole.

17. The system of claim 16, wherein one of the at least two constraints is user engagement with the online social networking system.

18. The system of claim 17, wherein one of the at least two constraints is user engagement with the online social networking system.

19. The system of claim 18, wherein the optimization criterion is configured to provide for a maximized revenue while maintaining user engagement within a percentage of a baseline.

20. The system of claim 17, providing the online social networking system is by causing the content items to be displayed on the user devices, and wherein user engagement is based, at least in part, on interaction by users with the content items.

21. The system of claim 20, wherein the interaction with the content items includes at least one of accessing a link included in the content item, commenting on the content item, sharing the content item, and providing an indication of approval of the content item.

22. The system of claim 20, wherein the first type is organic content items provided to the online social networking system by the users of the online social networking system and the second type is sponsored content items provided to the online social networking system by sponsors of the content items.

* * * * *

UNITED STATES PATENT AND TRADEMARK OFFICE
CERTIFICATE OF CORRECTION

PATENT NO. : 10,380,624 B2
APPLICATION NO. : 14/585863
DATED : August 13, 2019
INVENTOR(S) : Agarwal et al.

It is certified that error appears in the above-identified patent and that said Letters Patent is hereby corrected as shown below:

In the Claims

In Column 16, Line 59, in Claim 16, delete "positions" and insert --positions,-- therefor Signed and Sealed this
Twentieth Day of October, 2020

Andrei Iancu
*Director of the United States Patent and Trademark Office*